(12) United States Patent
Moon

(10) Patent No.: US 7,603,694 B2
(45) Date of Patent: Oct. 13, 2009

(54) VIRTUAL CHANNEL TABLE DATA STRUCTURE, TRANSPORT STREAM DISCRIMINATION METHOD, AND DIGITAL BROADCAST RECEIVER

(75) Inventor: Kyoung Soo Moon, Seoul (KR)

(73) Assignee: LG Electronics Inc., Seoul (KR)

( * ) Notice: Subject to any disclaimer, the term of this patent is extended or adjusted under 35 U.S.C. 154(b) by 740 days.

(21) Appl. No.: 11/041,279

(22) Filed: Jan. 25, 2005

(65) Prior Publication Data

US 2005/0166244 A1     Jul. 28, 2005

(30) Foreign Application Priority Data

Jan. 27, 2004   (KR)   ..................   10-2004-0005061

(51) Int. Cl.
*H04N 7/16*   (2006.01)
(52) U.S. Cl. .................... 725/140; 725/38; 725/40; 725/131; 725/132; 725/139; 725/151; 725/152; 348/563; 348/569; 348/570
(58) Field of Classification Search .................... 725/40, 725/131–134, 139–142, 151–153, 37–61; 348/462, 465, 484, 485, 563, 564, 569, 570, 348/731, 738
See application file for complete search history.

(56) References Cited

U.S. PATENT DOCUMENTS 6,111,612 A * 8/2000 Ozkan et al. ................ 348/465

6,879,349 B2 * 4/2005 Nishida et al. .............. 348/553
7,057,669 B2 * 6/2006 Lee ............................ 348/563
7,259,795 B2 * 8/2007 Lee ............................ 348/569
2002/0035726 A1 * 3/2002 Corl ............................ 725/39
2002/0044222 A1 * 4/2002 Lee ............................ 348/564

FOREIGN PATENT DOCUMENTS

CA    2322909 A1 *  4/2001
CA    2322909 A1 *  4/2001

OTHER PUBLICATIONS

Advanced Television Systems Committee, ATSC Standard: Program and System Information Protocol for Terrestrial Broadcast and Cable (Revision B), Document A/65B, Mar. 18, 2003, pp. 9, 29, 68, 72-75, 119, 120, 121, 126.*

(Continued)

*Primary Examiner*—John W Miller
*Assistant Examiner*—Christopher S McGahey
(74) *Attorney, Agent, or Firm*—McKenna Long & Aldridge LLP

(57) ABSTRACT

The present invention provides a virtual channel table (VCT) data structure, transport stream discrimination method, and digital broadcast receiver, by which streams transferred within a channel can be identified with VCT only by extending a VCT syntax according to PSIP (program and system information protocol) of ATSC (advanced television systems committee) prescribed as a digital TV standard. The present invention adds the additional explanation (component name string) descriptor for the stream to the service location descriptor of the VCT, whereby various streams transferred over one channel can be uniquely identified. Therefore, the present invention enables a user of the digital broadcast receiver to select a stream more quickly.

13 Claims, 9 Drawing Sheets

| Syntax | Bits | Format |
|---|---|---|
| service_location_descriptor(){ | | |
|    descriptor_tag | 8 | 0xA1 |
|    descriptor_length | 8 | uimsbf |
|    reserved | 3 | '111' |
|    PCR_PID | 13 | uimsbf |
|    number_elements | 8 | uimsbf |
|    for(i=0; i<number_elements; i++){ | | |
|       stream_type | 8 | uimsbf |
|       reserved | 2 | '11' |
|       stream_desc | 1 | uimsbf |
|       elementary_PID | 13 | uimsbf |
|       ISO_639_language_code | 8*3 | uimsbf |
|       if(stream_desc==1){ | | |
|          component_name_string() | var | |
|       } | | |
|    } | | |
| } | | |

OTHER PUBLICATIONS

ISO/IEC, International Standard 13818-1, Information technology—Generic coding of moving pictures and associated audio information: Systems, 2nd edition, Dec. 1, 2000, p. 46.*

Consumer Electronics Association, CEA Bulletin: PSIP Recommended Practice, CEA-CEB12-A, Oct. 2003, pp. 1, 3, 18, 19.*

ISO/IEC, International Standard 13818-1, Information technology—Generic coding of moving prictures and associated audio information: Systems, 2nd edition, Dec. 1, 2000, p. 46.*

* cited by examiner

FIG. 2
Related Art

| Syntax | Bits | Format |
|---|---|---|
| terrestrial_virtual_channel_table_section(){ | | |
|   table_id | 8 | 0xC8 |
|   section_syntax_indicator | 1 | '1' |
|   Private_indicator | 1 | '1' |
|   reserved | 2 | '11' |
|   section_length | 12 | uimsbf |
|   transport_stream_id | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_channels_in_section | 8 | uimsbf |
|   for(i=0; i<num_channels_in_section; i++){ | | |
|     short_name | 7*16 | unicode™ BMP |
|     reserved | 4 | '1111' |
|     major_channel_number | 10 | uimsbf |
|     minor_channel_number | 10 | uimsbf |
|     modulation_mode | 8 | uimsbf |
|     carrier_frequency | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslb |
|     reserved | 6 | '111111' |
|     service_type | 6 | uimsbf |
|     source_id | 16 | uimsbf |
|     reserved | 6 | '111111' |
|     descriptors_length | 10 | uimsbf |
|     for(i=0; i<N; i++){ | | |
|       descriptors() | | |
|     } | | |
|   } | | |
|   reserved | 6 | '111111' |
|   additional_descriptors_length | 10 | uimsbf |
|   for(j=0; j<N; j++){ | | |
|     additional_descriptors() | | |
|   } | | |
|   CRC_32 | 32 | rpchof |
| } | | |

FIG. 3
Related Art

| Syntax | Bits | Format |
|---|---|---|
| service_location_descriptor(){ | | |
|     descriptor_tag | 8 | 0xA1 |
|     descriptor_length | 8 | uimsbf |
|     reserved | 3 | '111' |
|     PCR_PID | 13 | uimsbf |
|     number_elements | 8 | uimsbf |
|     for(i=0; i<number_elements; i++){ | | |
|         stream_type | 8 | uimsbf |
|         reserved | 3 | '111' |
|         elementary_PID | 13 | uimsbf |
|         ISO_639_language_code | 8*3 | uimsbf |
|     } | | |
| } | | |

FIG. 4
Related Art

| Syntax | Bits | Format |
|---|---|---|
| component_name_descriptor(){ | | |
|     descriptor_tag | | 0xA3 |
|     descriptor_length | | uimsbf |
|     component_name_string() | var | |
| } | | |

FIG. 6

| Syntax | Bits | Format |
|---|---|---|
| service_location_descriptor(){ | | |
|    descriptor_tag | 8 | 0xA1 |
|    descriptor_length | 8 | uimsbf |
|    reserved | 3 | '111' |
|    PCR_PID | 13 | uimsbf |
|    number_elements | 8 | uimsbf |
|    for(i=0; i<number_elements; i++){ | | |
|       stream_type | 8 | uimsbf |
|       reserved | 2 | '11' |
|       stream_desc | 1 | uimsbf |
|       elementary_PID | 13 | uimsbf |
|       ISO_639_language_code | 8*3 | uimsbf |
|       if(stream_desc==1){ | | |
|       component_name_string() | var | |
|       } | | |
|    } | | |
| } | | |

FIG. 7
Related Art

| Syntax | Bits | Format |
|---|---|---|
| multiple_string_structure(){ | | |
|    number_strings | 8 | uimsbf |
|    for(i=0; i<number_strings: i++){ | | |
|       ISO_639_language_code | 8*3 | uimsbf |
|       number_segments | 8 | uimsbf |
|       for(j=0; j<number_strings: j++){ | | |
|          compression_type | 8 | uimsbf |
|          mode | 8 | uimsbf |
|          number_bytes | 8 | uimsbf |
|          for(k=0; k<number_bytes; k++) | | |
|             compressed_string_byte[k] | 8 | bslbf |
|       } | | |
|    } | | |
| } | | |

FIG. 10

| Time-shifted service descriptor module | Extended channel name descriptor module | Service location descriptor module | Component name descriptor module |
|---|---|---|---|
| | | | |

TVCT module

VIRTUAL CHANNEL TABLE DATA STRUCTURE, TRANSPORT STREAM DISCRIMINATION METHOD, AND DIGITAL BROADCAST RECEIVER

This application claims the benefit of the Korean Application No. 10-2004-0005061 filed on Jan. 27, 2004, which is hereby incorporated by reference.

BACKGROUND OF THE INVENTION

1. Field of the Invention

The present invention relates to PSIP (program and system information protocol) of ATSC (advanced television systems committee) prescribed as a digital TV standard, and more particularly, to a virtual channel table (VCT) data structure, transport stream discrimination method, and digital broadcast receiver, by which streams transferred within a channel can be identified with VCT only by extending a VCT syntax.

2. Discussion of the Related Art

Generally, Korea, U.S.A., and Canada have adopted ATSC (advanced television systems committee) as a digital broadcast standard. The ATSC defines PSIP (program and system information protocol) for searching a specific channel and audio and video transferred over the channel as well as audio/video encoding and decoding standards. And, the PSIP, which is regulated by a group of U.S. ATSC, is a protocol for transferring supplementary information containing information essentially necessary for viewing a digital TV.

Namely, EPG (electronic program guide) and SI (system information) are grouped into PSIP. The PSIP, which is a standard of ATSC for terrestrial and cable digital broadcasting, is defined to provide various kinds of information about a program in a manner of parsing messages encoded by MPEG-2 (moving picture experts group: ISO/IEC 1318-1 system). In other words, the PSIP standard is based on MPEG-2 (ISO/IEC 13818-1) and all tables defined in the PSIP follow private section syntaxes.

The PSIP consists of various tables to enable transmission/reception of A/V data according to MPEG-2 video and AC-3 audio formats and transmission of information of channels of broadcasting stations, information of programs of each of the channels, and the like. And, the PSIP can support a navigation function of providing an A/V service of specific broadcasting by a channel selection and a supplementary function of providing EPG for a broadcast program, i.e., a broadcast guide service.

FIG. 1 is a structural diagram of PSIP according to a related art.

Referring to FIG. 1, channel information for channel selection and information of a packet identifier number (PID) for A/V reception and the like are transferred via virtual channel table (VCT) and EPG informations of broadcast programs of respective channels are transferred via event information table (EIT). Namely, by parsing the VCT, it is able to know audio and video packet identifiers (PID) of the broadcast program carried over the channel together with a channel name, a channel number, and the like. Besides, in the PSIP, there exist a system time table (STT) for time information and a rating region table (RRT) for transferring information for a region, a consultation organ, and the like for a program rate. And, in the PSIP, there exist an extended text table (ETT) for supplementary explanation of a channel and a broadcast program, a master guide table (MGT) for management of versions and PIDs of the respective tables, and the like. Theses tables are transferred by a data structure called a section. Namely, each of the tables includes a basic unit called the section. And, at least one or more sections are combined to configure one table.

SUMMARY OF THE INVENTION

Accordingly, the present invention is directed to a virtual channel table (VCT) data structure, transport stream discrimination method, and digital broadcast receiver that substantially obviate one or more problems due to limitations and disadvantages of the related art.

An object of the present invention is to provide a virtual channel table (VCT) data structure, transport stream discrimination method, and digital broadcast receiver, by which a stream transferred within a channel can be uniquely identified by a VCT only in a manner of extending a service location identifier included in the VCT of a PSIP standard to be transferred.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a table belonging to a program and system information protocol (PSIP) defined for digital broadcasting, a data structure of a VCT (virtual channel table) according to the present invention includes a stream type of a broadcasting program, an elementary_PID, language information, and an additional explanation for a stream (component name string).

Preferably, the stream type of the broadcasting program, the elementary_PID, the language information, and the additional explanation for the stream (component name string) are inserted in a service location descriptor of the VCT.

Preferably, an information field (stream_desc) indicating whether the additional explanation for the stream (component name string) exists is further provided to the service location descriptor.

Preferably, the additional explanation for the stream (component name string) has a form of a multiple string structure defined in the PSIP.

In another aspect of the present invention, in discriminating types of streams transferred over one channel using tables within program-associated information defined for digital broadcasting, a transport stream discrimination method includes a transmission step of inserting a stream type of a broadcasting program, an elementary_PID, language information, and/or additional explanation for the stream (component name string) in a virtual channel table (VCT) among the tables to transmit and a reception step of identifying the types of the streams transferred over the one channel using the stream type, the language information, and/or the additional explanation for the streams (component name string) included in the VCT.

In another aspect of the present invention, in discriminating types of streams transferred over one channel using tables within program-associated information defined for digital broadcasting, a transport stream discrimination method includes a transmission step of inserting a stream type of a broadcasting program, an elementary_PID, language information, and/or additional explanation for the stream (component name string), and an information field (stream_desc) indicating whether the additional explanation for the stream (component name string) exists in a service location descriptor of a virtual channel table (VCT) among the tables to transmit and a reception step of if the information field indicates that the additional explanation for the stream exists in the service location descriptor, identifying the types of the streams transferred over the one channel using the stream type, the language information, and the additional explanation for the stream (component name string) within the service location descriptor.

Preferably, in the reception step, if the information field indicates that the additional explanation for the stream fails to exist in the service location descriptor, the types of the streams transferred over the one channel are identified using the stream type and the language information within the service location descriptor only.

In a further aspect of the present invention, a digital broadcast receiver includes a tuner tuning to digitalize a digital broadcast signal of a specific channel, a demultiplexer separating a VCT having a fixed PID from a multiplexed signal outputted from the tuner, a VCT parser identifying to store types of streams transferred over one channel by parsing the VCT separated in the demultiplexer to extract a stream type of a broadcasting program, an elementary_PID, language information, and an additional explanation for a stream (component name string), the VCT parser setting up a video PID and an audio PID in the demultiplexer, simultaneously, and an A/V decoder receiving to decode a video bit stream and an audio bit stream separated in the demultiplexer according to the video and audio PIDs set up by the VCT parser, respectively and outputting the decoded streams.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a structural diagram of an exemplary terrestrial VCT bit stream syntax;

FIG. 3 is a structural diagram of an exemplary bit stream syntax for a service location descriptor;

FIG. 4 is a structural diagram of a bit stream syntax of a component name descriptor defined within PMT of the PSI standard;

FIG. 6 is a structural diagram of a bit stream syntax of a service location descriptor defined in TVCT according to the present invention;

FIG. 7 is a structural diagram of an exemplary bit stream syntax of a multiple string structure;

FIG. 10 is a structural diagram of a TVCT parser in FIG. 9.

DETAILED DESCRIPTION OF THE INVENTION

Figure 1:
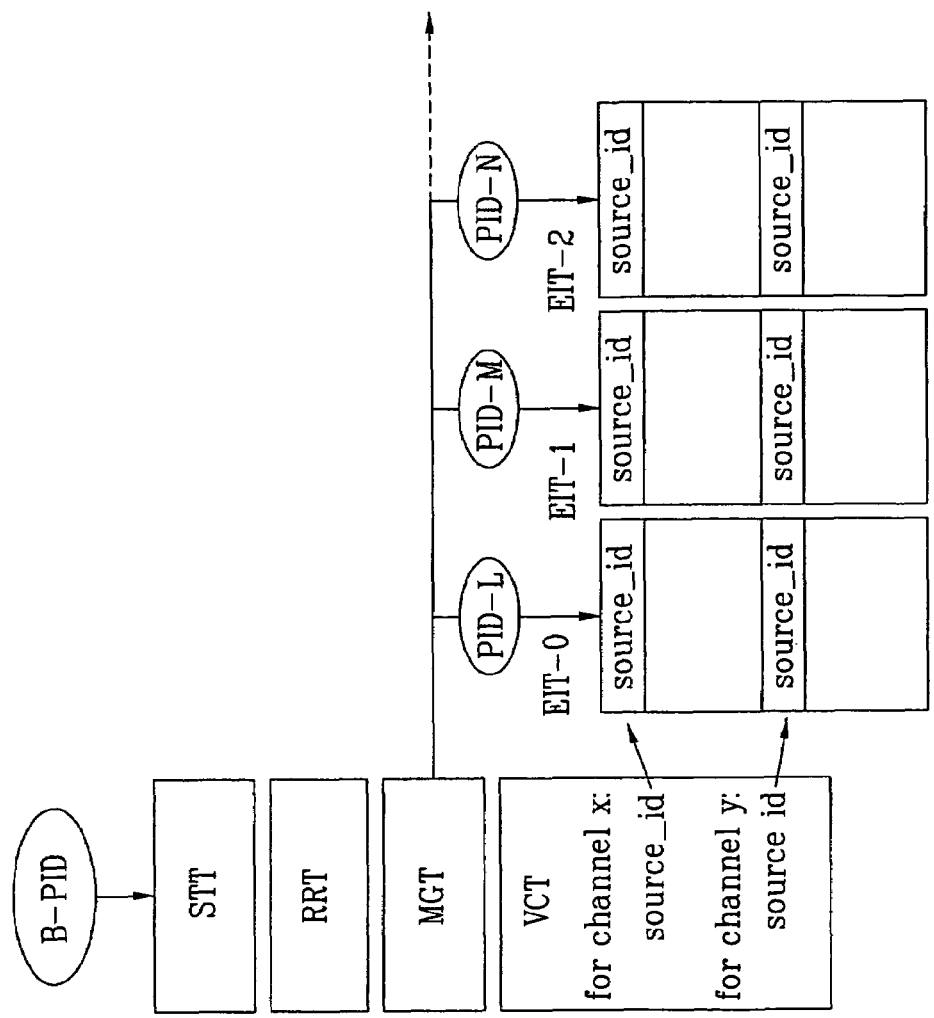
FIG. 1 is a structural diagram of PSIP according to a related art.

Reference will now be made in detail to the preferred embodiments of the present invention, examples of which are illustrated in the accompanying drawings. Wherever possible, the same reference numbers will be used throughout the drawings to refer to the same or like parts.

FIG. 2 is a structural diagram of a terrestrial VCT (TVCT) bit stream syntax described in A/65. Namely, VCT basically includes a transport stream ID, a channel number (major, minor), a short channel name, a carrier frequency, a program number, and the like, and additional information is included in a VCT descriptor.

Referring to FIG. 2, TVCT includes a table identifier table_id of 0xC8 and a PID for the TVCT is 0x1FFB. 'version_number' indicates a version value of VCT, 'section_number' indicates a number of a corresponding section, and 'last_section_number' indicates a number of a last section of the perfect VCT. 'num_channels_in_section' designates a number of total virtual channels existing within the VCT section.

'short_name' in a repetition statement of a 'for' loop indicates a virtual channel name and 'major_chanel_number' indicates a 'major' channel number associated with a virtual channel defined in the repetition statement. Each virtual channel number should be connected to a minor channel number and the major and minor channel numbers work as a user reference number for the corresponding virtual channel.

'program_number' is to connect a virtual channel having MPEG-2 PAT (program association table) and PMT (program map table) defined therein and coincides with the program number within the PAT/PMT. The PAT describes elements of a program for each program number and indicates PID of a transport packet transferring the PMT. The PMT describes a PID list and sub-information of a transport packet carrying each bit row of video, audio, and the like configuring the program and the program identification number.

'source_id' indicates a program source connected to a corresponding virtual channel. In this case, the source means one specific source such as video, text, data, or sound. A value of 'source_id' has a unique value within a transport stream carrying TVCT. 'descriptor_length' indicates a total length of a descriptor of the corresponding virtual channel and 'additional_descriptor_length' indicates a total length of all accompanied VCT descriptors. Namely, the TVCT carries the data of the respective virtual channels via the repetition statement including the 'for' loop.

Meanwhile, a descriptor loop descriptor{ } in the repetition statement of the 'for' loop may include a service location descriptor, an extended channel name descriptor, and a time-shifted service descriptor. In this case, the service location descriptor carries video/audio PID of a broadcast program.

FIG. 3 shoes an example of a bit stream syntax of a service location descriptor included in the descriptor loop. The service location descriptor includes PCR_PID indicating a PID of a stream having a valid PCR used in the program indicated by 'program_number'. Moreover, the repetition statement of the 'for' loop includes a type of each stream (audio, video, or data), 'elementary_PID' indicating that the corresponding stream comes via which PID, and a language.

Yet, since a transport stream has a bit stream type of enumeration of '0' and '1', it is unable to know whether the transport stream is audio, video, or data. In such a case, it is able to identify the transport stream using the information within the service location descriptor.

Namely, the transport stream enables a primary identification according to the stream type and also enables a secondary identification of the same stream type by language. In doing so, since one video exists in one channel in case of video, the identification is done according to the stream type only.

Yet, in case of audio, the identification work may fail despite the primary and secondary identifications. For instance, if two audios of Korean language exist, it is unable to identify the audios from each other with the stream type only.

Hence, in order to enable the identification, a component name descriptor of PMT transferred as PSI (program specific information) of the MPEG-2 standard is used.

FIG. 4 shows a bit stream syntax of the component name descriptor and may include a description string.

Figure 5:
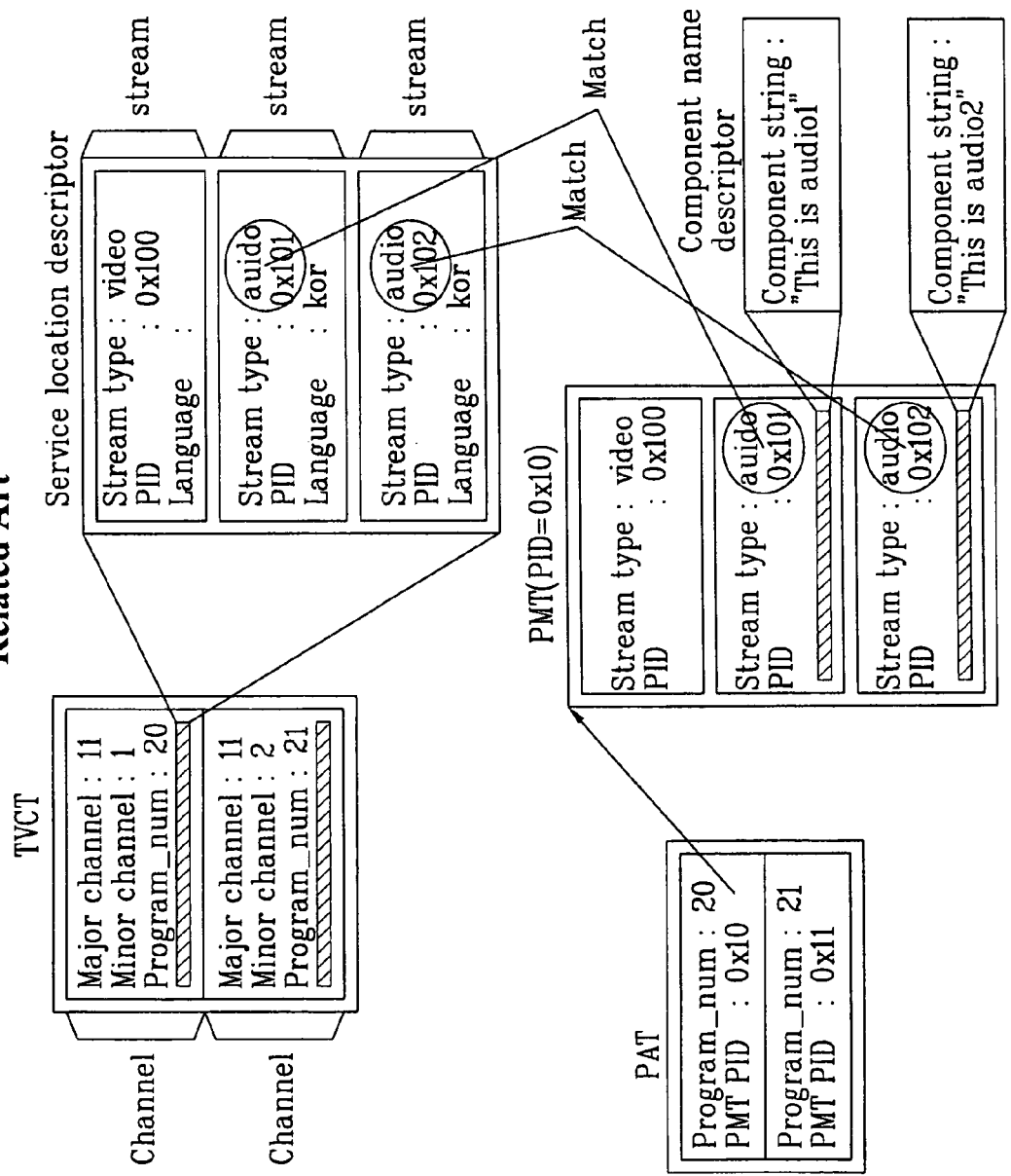
FIG. 5 is an exemplary diagram of a mapping between a service location descriptor of TVCT and PMT.

Namely, by finding a service location descriptor within a TVCT bit stream of the PSIP standard and a stream having the same PID of a stream type among streams defined in PMT of the PSI standard, mapping between the service location descriptor of the TVCT and a component name descriptor of the PMT, as shown in FIG. 5, is enabled.

First of all, TVCT and PAT having the same 'program_number' are matched to each other. For instance, in case of intending to discriminate a stream type of TVCT having 'program_number' of 20, it is matched to PAT having 'program_number' of 20. Considering the service location descriptor within the TVCT having 'program_number' of 20 in FIG. 5, a stream ID is 0x100 in case that the stream type is video. Yet, if the stream type is audio, there exist two stream IDs. Namely, there exist one audio stream having its stream ID of 0x101 and the other audio stream having its stream ID of 0x102 and, the two audio streams have the same languages of kor. Hence, it is unable to identify the two audio streams from each other.

In this case, PMT_PID (e.g., 0x10) is inserted in the PAT (i.e., program number=20) matched to the TVCT. Hence, the PMT having PMT_PID of 0x10 includes stream type information, PID, and the component name descriptor in FIG. 4. If the component name descriptor having its stream type of audio is parsed, it is able to finally identify the two audio streams.

Through the above-explained method, the streams having the same stream type and the same language can be identified from each other.

Thus, in order to uniquely identify the stream transferred within a channel in a digital TV receiver, TVCT of PSIP and PAT/PMT of PSI should be entirely received.

The present invention is characterized in uniquely identifying a stream transferred within a channel using TVCT of PSIP only and one embodiment of the present invention is shown in FIG. 6.

FIG. 6 is a structural diagram of a bit stream syntax of a service location descriptor defined in TVCT according to the present invention, in which the service location descriptor is extended from that of FIG. 3.

A service location descriptor in FIG. 6 includes 'PCR_PID' indicating PID of a stream having valid PCR used in a program indicated by 'program_number'. And, a repetition statement of a 'for' loop includes a type of each stream (audio, video, or data), 'elementary_PID' indicating that a corresponding stream comes with which PID, a language, 'stream_desc', and component_name_string( ).

One bit is allocated to the 'stream_desc' filed to indicate whether additional explanation (component name string) for the stream exists.

In this case, one bit is exemplary only. Optionally, a plurality of bits are allocated thereto to represent whether additional explanation (component_name_string) for the stream exists.

The 'component_name_string( )' has a form of a multiple string structure. Namely, if the additional explanation for the stream (component_name_string) is included in the service location descriptor, the 'stream_desc' becomes 1. If not, it becomes zero.

Hence, in identifying a type of a received bit stream, if the 'stream_desc' is 1, identification is carried out using the stream type, 'elementary_PID', and 'component_name_string( )'. If the 'stream_desc' is 0, identification is carried out using the stream type and 'elementary_PID' only since the 'component_name_string( )' fails to exist.

The 'component_name_string( )', as shown in FIG. 7, has the multiple string structure defined in PSIP like the component name descriptor of PMT.

The original reason of transferring TVCT is to provide information of a channel. Yet, in the present invention, the service location descriptor within TVCT is extended for fast tuning. Namely, the component name string defined in the PMT is added to the service location descriptor of the TVCT, whereby various streams transferred within the channel can be uniquely identified using the TVCT only without receiving all of the TVCT and PAT/PMT. Hence, in case that a user of a digital broadcast receiver intends to view a specific broadcast program, fast tuning can be achieved.

Figure 8:
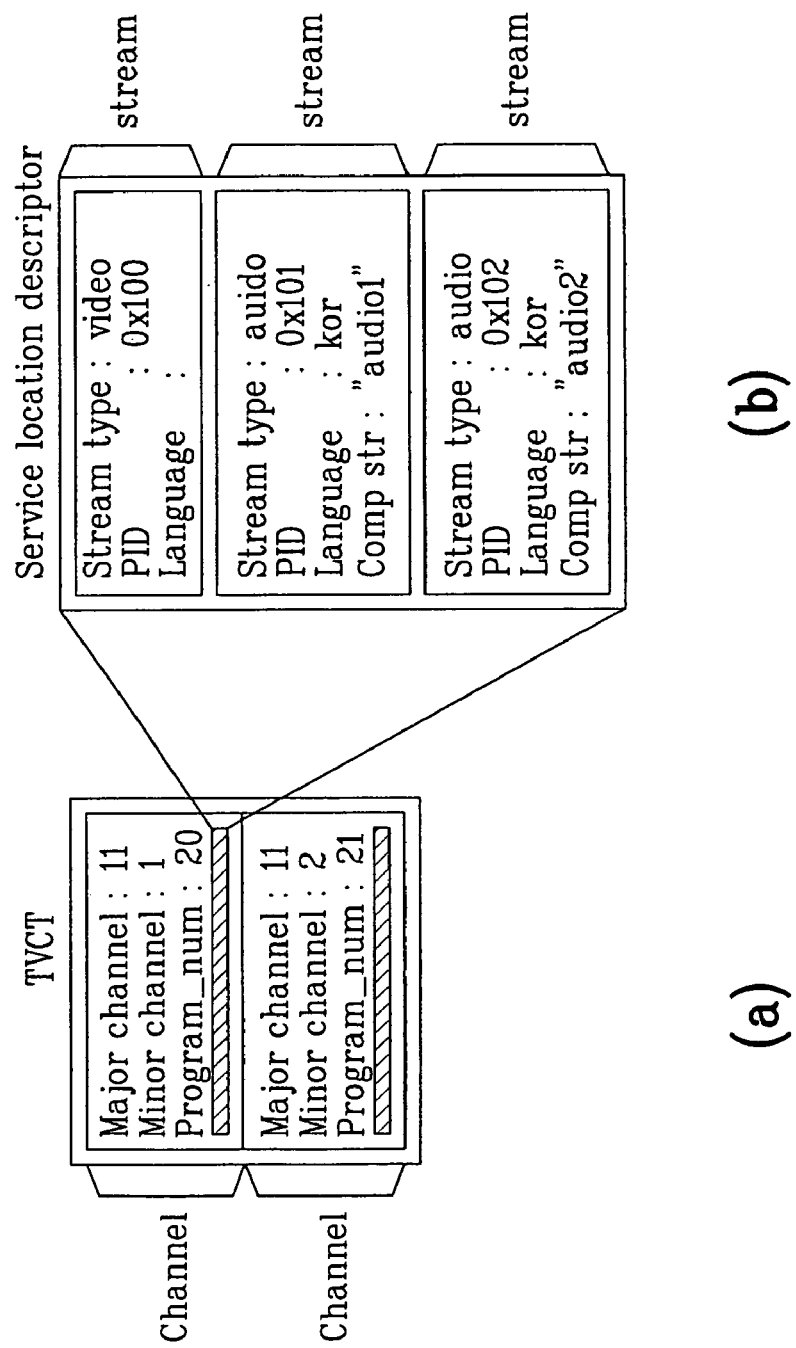
FIG. 8 is an exemplary diagram of deciding a bit stream type using a service location descriptor of TVCT only according to the present invention.

FIG. 8 shows a process of identifying a transport stream using a service location descriptor of TVCT only according to the present invention.

In TVCT shown in (a) of FIG. 8, two channels 11-1 and 11-2 exist within one RF frequency. If a service location descriptor of the channel 11-1 is parsed, it can be seen that three streams, as shown in (b) of FIG. 8, exist. In this case, it can be discriminated that first, second, and third streams are video, audio, and audio according to the values of stream type fields, respectively. In case of theses streams, language values of the audio streams are all Korean. Hence, the conventional PSIP standard is unable to distinguish the two audio streams from each other using the TVCT only. Namely, by parsing the component name descriptor after completion of receiving PAT/PMT, it is able to distinguish the two audios within the channel.

Yet, in the present invention, only TVCT, as shown in (b) of FIG. 8, is received to distinguish the two audios. Namely, the streams having the same stream type and the same language can be identified by parsing the component name string as shown in FIG. 7.

Therefore, the present invention can inform a user that there exist several audios right after displaying the correspond contents on a screen via audio/video PID.

Figure 9:
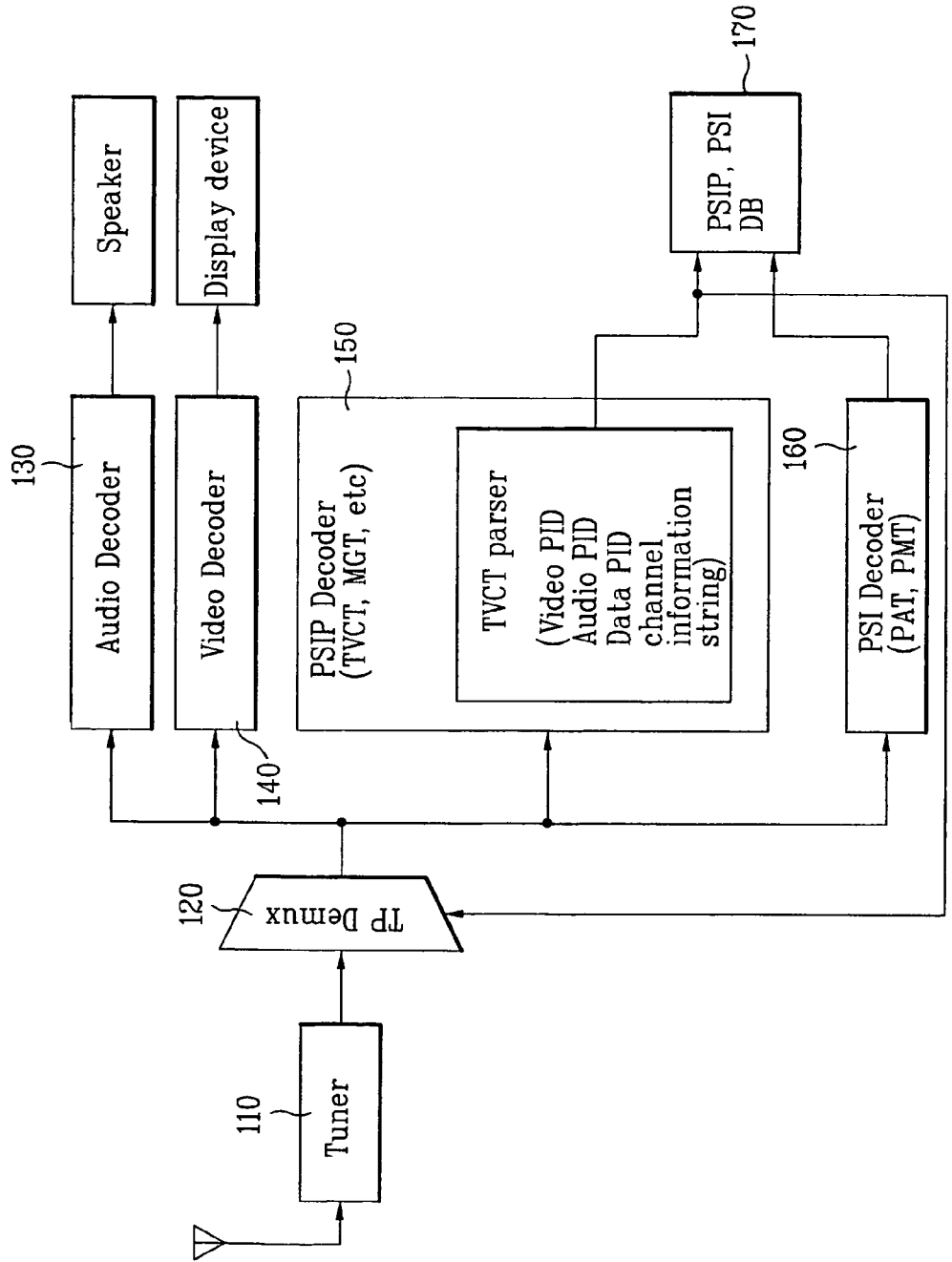
FIG. 9 is a block diagram of a digital broadcast receiver for stream discrimination according to the present invention.

FIG. 9 is a block diagram of a digital broadcast receiver for stream discrimination according to the present invention.

Referring to FIG. 9, a tuner 110 tunes an RF signal of a specific channel, digitalizes the tuned signal, modulates the digitalized signal, and then outputs the modulated signal to a TP (transport) demultiplexer 120. The TP demultiplexer 120 preferentially separates a TVCT having a fixed PID. And, the TVCT is outputted to a TVCT parser in a PISP decoder 150.

The TVCT parser parses the extended TVCT defined as the PSIP standard to extract channel information such as a channel name, a channel number, and the like and elementary stream information belonging to a channel, e.g., an audio PID, a video PID, and a component name string of each elementary stream and stores the extracted information in PISP/PSI database 170. Simultaneously, the TVCT parser sets up video and audio IDs in the TP demultiplexer 120.

Namely, the TVCT parser, as shown in FIG. 10, parses a time-shifted service module, an extended channel name descriptor module, and a service location descriptor module to obtain channel information and parses a component name descriptor to obtain an additional string explaining each elementary stream, thereby enabling a user to select a specific service. Namely, a digital broadcast receiver of the present invention is capable of identifying a stream type and streams having the same language with the TVCT only even if a time point of receiving PAT and PMT is delayed.

In this case, the information obtained from the PMT parser is just used for verification of the information received via the TVCT.

Hence, a time point of configuring the necessary information for identifying the stream transferred within the channel uniquely is completed the moment the TVCT parser within the PSIP decoder 150 stores the parsed TVCT in the PSIP/PSI database 170.

Meanwhile, the TP demultiplexer 120 identifies the video stream and the audio stream from the multiplexed TP according to the video and audio Ids set by the TVCT parser. The separated audio bit stream is outputted to an audio decoder 130 and the video bit stream is outputted to a video decoder 140.

The audio decoder 130 applies predefined audio decoding algorithm to the inputted audio bit stream to restore into an original audio signal. And, the video decoder 140 applies predefined video decoding algorithm to the inputted video bit stream to restore into an original video signal.

Thus, the digital broadcast receiver according to the present invention receives and parses the TVCT only, thereby providing a function enabling a user to select an elementary video/audio stream.

Namely, a general digital broadcast receiver preferentially receives TVCT after channel tuning to show contents of a tuned channel to a user as soon as possible. This is because a time taken for a digital TV to visualize an image after tuning is several times longer than that of an analog TV.

In doing so, the service location descriptor within the extended TVCT according to the present invention is utilized to enable a user to select specific audio as soon as possible. Namely, since the audio stream transferred within the channel can be identified with the TVCT only instead of waiting for the reception of PAT/PMT for audio selection, a user's selection can be made in a shortest time.

Meanwhile, the terminologies used in the description of the present invention are defined to take the functions in the present invention into consideration and may vary according to intentions or conventions of those skilled in the art. Hence, the definitions of the terminologies should be made based on the overall contents of the present invention.

As mentioned in the description of the VCT data structure, transport stream discrimination method, and digital broadcast receiver according to the present invention, the additional explanation (component name string) descriptor for the stream is added to the service location descriptor of the VCT, whereby various streams transferred over one channel can be uniquely identified. Specifically, the streams having the same stream type and the same language can be identified from each other with the VCT only. Therefore, the present invention enables a user of the digital broadcast receiver to select a stream more quickly.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. In a digital broadcasting system, a method of identifying one bit stream from a plurality of bit streams, the method comprising:
   a digital broadcast receiver receiving a virtual channel table (VCT) that includes a service location descriptor, wherein the service location descriptor contains information relating to the one bit stream, the information including: a stream type, an elementary_PID, language information, and a component name string; and
   identifying the one bit stream from the plurality of bit streams using the stream type, the elementary_PID and the component name string.

2. The method of claim 1, wherein the component name string is a multiple string sequence.

3. In a digital broadcasting system, a method of identifying one bit stream in a plurality of bit streams, the method comprising:
   a digital broadcast receiver receiving a virtual channel table (VCT) that contains information for each of the plurality of bit streams, the information including: a stream type, an elementary_PID, language information and a component name string indicator that indicates whether the VCT contains a component name string for the one bit stream; and
   identifying the one bit stream from the plurality of bit streams using the corresponding stream type, the PID, and if the VCT includes a corresponding component name string as indicated by the component name string indicator, additionally using the component name string.

4. The method of claim 3, wherein identifying the one bit stream further comprises:
   identifying the one bit stream from the plurality of bit streams using the stream type and the PID, if the VCT does not include a component name string as indicated by the component name string indicator.

5. The method of claim 3, wherein the component name string is a multiple string sequence.

6. A digital broadcast receiver comprising:
   a tuner tuning to a specific channel and outputting a multiplexed signal;
   a demultiplexer separating a VCT (virtual channel table) having a fixed PID from the multiplexed signal;
   a VCT parser identifying each of a plurality of bit streams transferred over one of a plurality of channels by parsing the VCT, where the VCT includes information relating to each of the plurality of bit streams, the information including: a stream type, an elementary_PID, language information, and a component name string indicator that indicates whether the VCT also includes a component name string, and wherein the demultiplexer is further adapted to extract at least one audio bit stream from the plurality of bit streams based on the stream type, PID and the component name string if it is present in the VCT as indicated by the component name string indicator; and
   an A/V decoder decoding a video bit stream and the audio bit stream and outputting the decoded streams.

7. The digital broadcast receiver of claim 6, wherein the demultiplexer is further adapted to extract the audio bit stream based on the corresponding stream type and corresponding PID if the VCT does not include the component name string as indicated by the component name string indicator.

8. The digital broadcast receiver of claim 6, wherein the component name string is a multiple string sequence.

9. The method of claim 1, wherein identifying the one bit stream from the plurality of bit streams further comprises:
using the language information.

10. The method of claim 3, wherein identifying the one bit stream from the plurality of bit streams further comprises:
using the language information.

11. The method of claim 3, wherein the VCT includes a service location descriptor, and wherein the stream type, elementary_PID, language information, and component name string are inserted into the service location descriptor of the VCT.

12. The digital broadcast receiver of claim 6, wherein the demultiplexer is further adapted to extract at least one audio bit stream from the plurality of bit streams based on the language information.

13. The digital broadcast receiver of claim 6, wherein the VCT includes a service location descriptor, and wherein the stream type, elementary_PID, language information, and component name string are inserted into the service location descriptor of the VCT.

* * * * *